United States Patent

Dyckman et al.

[11] 4,075,319
[45] Feb. 21, 1978

[54] LOW LEACHING ANTIFOULING ORGANOMETALLIC POLYVINYLS

[75] Inventors: Edward J. Dyckman, Sunderland; Deborah M. Andersen, Annapolis; Eugene C. Fischer, Arnold, all of Md.

[73] Assignee: The United States of America as represented by the Secretary of the Navy, Washington, D.C.

[21] Appl. No.: 699,744

[22] Filed: June 24, 1976

[51] Int. Cl.² .......................... C08F 8/42; C08K 5/57; B32B 27/06
[52] U.S. Cl. .................................. 424/78; 106/15 R; 424/288; 526/48.1
[58] Field of Search ...................... 526/48; 106/15 R; 424/288

[56] References Cited

U.S. PATENT DOCUMENTS

| 3,684,752 | 8/1972 | Goto et al. | 106/15 R X |
| 3,861,949 | 1/1975 | Onozuka et al. | 106/15 R X |
| 4,010,141 | 3/1977 | Onozuka et al. | 106/15 R X |

FOREIGN PATENT DOCUMENTS

| 451,626 | 11/1965 | Japan | 526/48 |

*Primary Examiner*—William F. Hamrock
*Attorney, Agent, or Firm*—R. S. Sciascia; A. L. Branning; P. J. Hagan

[57] ABSTRACT

Marine structures which are designed to be submerged in an aqueous environment containing fouling organism are protected from fouling by the use of an organotin containing polymer wherein the tin is chemically bonded to the polymer. The polymer inhibits fouling of the exposed surface of the structure while minimizing the adverse effects on the surrounding environment due to reduced leaching of the organotin compound from the polymer.

12 Claims, No Drawings

LOW LEACHING ANTIFOULING ORGANOMETALLIC POLYVINYLS

BACKGROUND OF THE INVENTION

This invention relates to a method and composition for preventing the fouling of submerged objects or marine structures while also minimizing pollution, and more particularly to a method and composition for preventing fouling of marine structures for an extended period of time by using organotin compounds which are chemically bonded to synthetic polymers.

From the beginning of man's attempt to use water to travel, he has been plagued with the problem resulting from the fouling of ships, buoys, pilings, and other types of marine structures, by organisms present in the water. It has been found that microorganisms, their viscous bio-organic product and absorbed organic matter, constitute a tenacious, opaque slime which forms on these submerged surfaces. The initial organisms in this fouling sequence are bacteria followed by a biotic progression of diatoms, hydrids, algae, bryozoans, protozoans, and finally macrofoulants Macrofoulants tend to be rugophilic, settling on roughened surfaces in preference to smooth surfaces. It is thought that primary marine slimes precondition the submerged surface in some manner stimulating the settling of macrofoulants. This theory is supported by the fact that barnacle settlement is less frequent on clean glass surfaces compared to those covered with emollient films high in particulate matter. This film may provide a physical substrate and/or a nutritive source which encourages the attachment of macroscopic plants and animals.

The resultant effect of the concentration of these plants and animals settling and attaching themselves to ships is that they contribute significantly to speed reduction, they increase fuel consumption, and in the area of concern over water craft detection, they strengthen the noise signature of vessels under way thereby rendering covert activity more difficult.

The problem of fouling applies not only to vessels but also to other marine structures. For example, fouling of sonar domes has been found to seriously limit the active and passive modes of operation of ships' acoustical systems. Fouling of moored data systems and ship-and-shore facilities by marine organisms impedes operations and necessitates a large maintenance allocation. Buoys can shift due to the excessive weight of fouling organisms. Wood pilings in berthing facilities undergo structural weakening and ultimate destruction due to marine borer and fungal attack. The fouling of piping including steel piping and bronze couplings and fittings in the sea-water intake piping systems of ship-and-shore facilities leads to reduced flow rates, valve seat damage, and accelerated metal corrosion. Concrete or ferro-cement or other similar structures are also adversely affected by fouling organisms.

It is only since the beginning of this century that improvements have been made in the early Phoenician methods of using copper cladding and poisonous paints to prevent fouling. One such improvement involved the use of asphalt as an antifouling coating. Another improvement involved the use of coatings containing copper salts or oxides. In addition, organometallic salts, e.g., tri-n-butyltin oxide (TBTO), tri-n-butyltin fluoride (TBFT), tri-n-butyltin sulfide (TBTS), being extremely powerful biocides and toxic to a wide range of marine organisms, have been used as the active ingredients in a variety of antifouling coatings. Investigations into the use of organotin compounds for use in antifouling paints have received much attention because coatings containing these compounds exhibit excellent pigment retention, but do not accelerate the corrosion of metal substrates. However, these and other state-of-the-art compositions possess several drawbacks which limit their use as effective antifoulants. Asphalt lacks the desired durability to make it an effective answer to the problems posed. Other existing antifouling coating systems involve the use of paints which typically contain sufficient water soluble pigments, metal salts and inert fillers for direct contact to occur between the particles within the paint film; as one particle dissolves, another in contact with it is exposed to solvolysis. This process, called leaching, is uncontrolled and varies with such factors as coating age, water velocity, temperature and salinity, and the primary slime layer. Quantitative information indicates that in most cases the leaching rate of antifouling paints is excessive and poses a potential environmental hazard. As a result, the best available antifouling coatings are inefficient and short lived because of the above mentioned leaching process. This inefficiency leads to the concentration of the antifouling agent in the water in quantities well above normal oceanic background.

Although concern over avoiding a potential pollution hazard was not a motivating factor, attempts have been made in the past to incorporate the toxic substance in a polymeric antifouling coating composition by chemically bonding the toxic ingredient to the polymer. For example, see Leebrick, U.S. Pat. No. 3,167,473, or Goto et al, U.S. Pat. No. 3,684,752. However, this type of antifouling compositions has not proved to be commercially successful, apparently because of the inability of the resulting coatings to maintain their integrity over an extended period of time.

Thus, after approximately 12 to 20 months, or 50,000 miles transit the presently available antifouling paint systems begin to foul which, is indicative of the depletion of most of the antifouling agent from the coating into the marine environment, or of a complete breakdown of the coating itself. This short performance time is far less than the life time of five years or more desired of an antifouling coating.

The leaching rate of metallic salts and organometallic salts from presently used antifouling coating systems is governed by the relative proportions and solubilities of three components: rosin, antifouling agent and pigment. Rosins are resinous organic acids which have a water solubility of 100 mg/cm$^2$/day. In addition to a relatively high solubility, rosins are consumed by sliming marine bacteria. This results in an accelerated biodegradable action, thus adding to the breakdown of the coating and subsequent accelerated release of metallic and oganometallic salts. At present the primary antifouling agent used by the United States Navy are cuprous oxide which has a water solubility of 0.5 mg/l and tributyltinfluoride which has a water solublity of 2.9 mg/l. Leaching of inorganic and organometallic antifouling salts from coating formulations could possibly be reduced by using their less water-soluble homologs in conjunction with insoluble pigments and as little rosin as possible. However, state-of-the-art antifouling technology has not provided an effective antifouling composition having a controlled leaching rate which minimizes the presence of toxic antifouling agents in the marine environment. Hence, it would be desirable to provide a new class of effective antifouling compositions having low leaching rates as compared to hitherto available compositions.

SUMMARY OF THE INVENTION

Accordingly, it is an object of this invention to provide a composition and method for the protection of marine structures from fouling organisms.

It is also an object of this invention to provide a composition and method for the protection of marine structures from fouling organisms for an extended period of time.

It is a further object of this invention to provide a composition and method for preventing the formation of a primary slime layer on marine structures.

Another object of this invention is to provide a composition and method for the preventing of fouling of marine structures while avoiding a potential environmental hazard.

It is also an object of this invention to provide an antifouling composition characterized by a low leaching rate of the antifouling agent from the composition.

These and other objects of this invention are met by providing a composition which comprises an organotin containing polymer wherein the organotin moiety is chemically bonded either directly to the polymer backbone or through a curing agent for the polymer, and a method of using said composition which involves forming, coating or impregnating a marine structure with said composition.

DESCRIPTION OF THE PREFERRED EMBODIMENTS

The present invention provides a novel polymeric material possessing a low leaching rate, which is nonpolluting, and has excellent biocidal properties, and which upon application to the surface of, or incorporation in, a marine structure results in a structure which is free of fouling organisms but does not contribute to pollution. This result is obtainable due to the fact that the biocidal quality of the antifouling agent protects the surface of the structure but is not detrimental to the animal or vegetable life immediately surrounding the protected structure because of the low leaching rate of the antifouling agent from the polymer.

This new generation of biocidal polymers consists of low leaching, antisliming, organometallic polymers suitable as protective coatings for ship bottoms and other submerged surfaces, wherein in the backbone polymer is a vinyl resin such as a polyacrylate or a poly (methyl vinyl ether/maleic acid); an alkyd resin, or an epoxy resin; and chemically incorporated in the polymer is a $R_3Sn$-group such as tributyltin, tripropyltin, triphenyltin; or tribenzyltin. These polymers may be used in any number of suitable forms including (1) low leaching organometallic polymeric films suitable for use as coatings or in reinforced or self-supporting structures; (2) low leaching organometallic polymeric syrups of the above described organometallic polymers applicable for the impregnation of structural woods in order to preserve these structures against bacteria, fungi and marine foulant attack; and (3) low leaching, granulated, organometallic polymers to be used for incorporation into ferro-cement, and other marine and fresh water concrete structures, thus producing a homogeneous nonfouling ferrocement and/or concrete structural composite.

It is estimated that these materials will extend the longevity of antifouling systems to at least 5 years. In addition, transparent, nonwettable, slimicidal films of the organometallic polymers can be used on underwater optical devices.

Because the antifouling compositions in general use today do not provide a satisfactory means of controlling the leaching rate of toxic coating components into the marine environment, the idea of chemically binding biocidal organometallic compounds on polymer backbones was conceived of as a solution to the problem. The resultant materials, organometallic polymers, are surface hydrolyzed in sea water to trigger their antifouling efectiveness. Laboratory studies show that the chemically bound organometallic moieties are released at a rate that is dependent on the nature of the organometallic polymer. As part of an effort to develop antifouling coatings having the lowest possible controlled leaching rates, various organometallic polymers were synthesized for the purpose of determining the rate of release of organometallic moieties from these polymers as well as their antifouling effectiveness. Factors influencing the rate of hydrolysis of the organometallic polymer, include polymer type, the degree of cross-linking within the polymer backbone and the degree of substitution by organometallic groups along the polymer backbone. Environmental conditions such as sea-water temperature, salinity, oxygen content, hydrogen ion concentration, and turbulence also influence the hydrolysis rate. Due to water hydrolysis, these organometallic ions are released from the polymer backbone at a controlled rate which is at least one order of magnitude less than state-of-the-art antifouling coatings. As a result, this chemical conservation of the biocidal organometallic agents will provide longer-term antifouling protection for marine structures, while reducing the potential pollution hazard attributed to presently used antifouling coatings by a factor of at least 10.

Any suitable method may be used to incorporate the organotin moiety into the polymer. For example, the incorporation can be accomplished by using an esterification reaction between an organotin oxide or hydroxide and a free carboxylic acid group present in the polymer. The organo-groups substituted on the tin may be the same or different and are selected from the group consisting of propyl, butyl, benzyl, and phenyl. Other groups do not appear to give the required long life antifouling capabilities. While it is not desired to be limited to any particular theory, it is believed that the chemical bond between the antifouling agent and the polymer prevents excessive leaching of the toxic agent from the composition. Because excessive leaching does not take place, there is no excess biocide in the water. Hence, there is no killing of plant and animal life in the water surrounding the protected structure by the antifouling composition. The low leaching rate also extends the life of the antifouling composition.

The reaction between the carboxylic acid group and the organotin oxide or hydroxide can be carried out in a number of ways. A monomeric acid may be esterified with a suitable tin compound and polymerized alone or in combination, with other monomers which may or may not contain organotin moieties. Alternatively, the tin compound may be reacted with free carboxylic acid groups on the polymer backbone. Also, the organotin compound can be chemically combined with a crosslinking or curing agent and used to crosslink or cure a polymer, especially a thermosetting polymer. Any other suitable method can also be used to chemically incorporate the organotin compound into the polymer provided the tin compound is chemically bonded to the polymer. It is the chemical bond which gives the improved durability, and low leaching characteristics to the polymer.

Of the particular organotin groups, the tributyl-or tripropyltin groups are the most effective because they possess greater toxicity.

The tributyltin oxide or hydroxide can also be chemically reacted with a polymer which is chemically bonded to other tin compounds. When a tributyl or tripropyltin containing compound in conjunction with another organotin containing compound is incorporated in a polymer, the result is an antifouling composition more durable than the second organotin containing compound acting alone. Also, various tin-containing polymers can be mixed in any proportion in order to achieve desired antifouling properties. Furthermore, a single polymer may contain more than one type of organotin compound. Mixtures of organotin compounds on a polymer or mixtures of organotin containing polymers are effective against a broader spectrum of fouling agents.

The tin compound, used in accordance with the present invention, has the following structural formula:

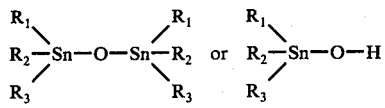

wherein $R_1$, $R_2$, and $R_3$ are selected from a group consisting of butyl, propyl, phenyl and benzyl. $R_1$, $R_2$ and $R_3$ can be the same or different.

Suitable polymers to which the organic tin compounds may be chemically bonded are thermoplastic polymers such as vinyl polymers and thermosetting polymers such as polyester resins and epoxy polymers. Vinyl polymers include homopolymers and copolymers of acrylic and methacrylic acid monomers. The organotin containing polymers can be formed by polymerizing organotin oxide or hydroxide — acrylic acid esters alone or in combination with monomers which may or may not contain an organotin moiety. Monomers suitable for forming the acrylic polymers are acrylic acid and methacrylic acid. To incorporate the organotin compound in the acrylic polymer, the acid group are usually esterified with the organotin compounds subsequent to polymerization of the acid monomers.

Another suitable vinyl polymer is a copolymer of methyl vinyl ether and maleic acid. Incorporation of the organotin compound is achieved by esterification of the acid group.

The development of organometallic polyesters and organometallic epoxies as effective antifouling materials has also been accomplished. Unsaturated alkyd resins prepared from the condensation reaction of polyhydric alcohols such as glycols and other polyols and polybasic acids such as adipic, sebacic, phthalic and maleic acid are cured with tributyltin methacrylate in a 1:1 molar ratio using an initiator to produce organometallic polyesters. Styrene in varying proportions may also be added to the monomer mixture prior to curing. These organometallic polyesters can either be dissolved in a solvent with or without additives such as pigments, thixotropic agents, or anti-settling agents, to produce an antifouling coating, or used by themselves in antifouling applications, i.e., antifouling gel coats. Furthermore, incorporation of glass fibers into this resin could produce a glass reinforced laminate with antifouling capability. In addition to incorporating the organotin moiety by curing an unsaturated resin with tributyltin methacrylate or other organometallic unsaturated monomers, the organotin group can be chemically incorporated on the resin backbone by esterification of some of the free carboxyl groups present where polybasic acids have been used in the resin formulation.

The concept of producing an antifouling structural plastic by curing with an organometallic agent can also be applied to epoxy resins. Unsaturated acids such as acrylic acids are known curing agents for glycidyl ether epoxy resins. When an organic acid is employed to cure an epoxy resin in an hydroxyl-free medium, the initial reaction involves the carboxyl group, followed by the reaction of the epoxy with the formed hydroxyl. The double bond of an unsaturated acid during this reaction remains inactive, and may be used to incorporate the organometallic reagent on the curing agent. It is known that tributyltrin methacrylate can be copolymerized with methacrylic acid. Therefore, a low melecular weight copolymer of tributyltin methacrylate and methacrylic acid can be utilized as an organometallic curing agent for epoxy resins. Modifications of the structures of amines, polyamines, polycarboxylic acids, and like compounds presently used as epoxide curing agents by incorporation of a tributyltin carboxylate group, e.g., $H_2NCH_2CO_2SnR_3$ and $R_3SnO_2CCH(CO_2H)_2$ where R is an organic radical can be prepared to function as new curing agents serving as carriers for the biocidal organotin moiety.

The effectiveness of the organotin containing polymer as to both antifouling capabilities and durability depends on the amount of organotin present. Molecular weight of the polymer does not appear to have an effect on these properties. However, polymers having a 6000-7000 molecular weight range are more conviently used.

The organotin containing component is operable in any range. However, a polymer containing at least 20% of the organotin component is most effective. For example, if organotin methacrylate and methyl methacrylate are polymerized together, there should be at least one unit of organotin methacrylate for every four units of methyl methacrylate. With regard to the amount of polymer present, a coating consisting essentially of an organotin polymer has been tested and the following conclusions drawn. While any reasonable coating thickness is feasible, coatings up to ⅛-inch thick are most useful. Coatings in the neighborhood of 20 mils thickness are also useful. Thickness may vary with amount of tin in the polymer and the length of time for which protection is desired.

The following examples are presented to illustrate the invention without unduly limiting the invention. All parts and percentages are by weight of the composition unless otherwise specified.

EXAMPLE I

The following procedures illustrate the preparation of a variety of vinyl polymers suitable for use as antifouling materials.

P1, POLY-TRI-n-BUTYLTIN-ACRYLATE

The reaction was carried out in a 1-liter, 3-necked flask, provided with an azeotropic distillation head connected to a reflux condenser, a thermometer positioned such that it read the temperature of the reaction solution, and a stopper. The reaction solution was stirred by means of a magnetic stirrer. In the reaction flask, polyacrylic acid (24 grams, 0.333 mole) was added to a solution of tri-n-butyltin oxide (84.8 ml, 0.167 mole) and dichloromethane (250 ml). The reaction was refluxed for 2 hours, at the end of which 3 ml of water was formed and collected by azeotropic distillation. The resultant clear organometallic polymer was cast in a film from the dichloromethane solution.

Analysis calculated on atomic absorption spectroscopy for P1: Sn, 33%. Found: Sn, 32.68%.

P2, POLY-TRI-n-PROPYLTIN-ACRYLATE

P2 was prepared similar to P1 except that tri-n-propyltin oxide (68.2 ml, 0.167 mole) was the organometallic and benzene was the solvent. Three ml of water were formed by this reaction. The product polymer was again clear and was cast as a film from the benzene solution.

Analysis calculated for P2: Sn, 37%. Found: Sn, 36.52%.

P4, POLY (TRI-n-BUTYLTIN-ACRYLATE/TRI-n-PROPYLTIN-ACRYLATE)

P4 was synthesized by the general method described above. In this synthesis, equimolar quantities of tri-n-butyltin oxide (42.2 ml, 0.083 mole) and tri-n-propyltin oxide (33.9 ml, 0.083 mole) were reacted with polyacrylic acid in benzene to give a polymer with alternating organometallic groups. After 3 hours of refluxing, 3 ml of water were collected azeotropically. This clear polymer was cast as a film from the benzene solution.

P13, POLY-TRI-n-BUTYLTIN-METHACRYLATE

P13 was prepared in the usual manner from the reaction of crosslinked polymethacrylic acid (28.8 grams, 0.167 mole) and tri-n-butyltin oxide (42.2 ml, 0.083 mole) in toluene (300 ml). After the reaction had run for 3 hours, 16.2 ml of water were formed. The reaction mixture was filtered, and the isolated white powdery product was then washed with toluene.

Analysis calculated for P13: Sn, 32%. Found: Sn, 27.77%.

P16, POLY-TRIMETHYLTIN-ACRYLATE

P16 was prepared as poly-tri-n-butyltin-acrylate except that the organometallic was trimethyltin hydroxide (60 grams, 0.333 mole) and the solvent was benzene (300 ml). The reaction was terminated at the end of 2½ hours. Five ml of water were produced by this synthesis. The white powdery product was isolated by filtering and washing the reaction mixture with benzene.

Analysis calculated for P16: Sn, 51%. Found: Sn, 28.24%.

P17, POLY-TRIMETHYLTIN-METHACRYLATE

P17 was synthesized as described above by the reaction of crosslinked polymethacrylic acid (28.8 grams, 0.167 mole) and trimethyltin hydroxide (30 grams, 0.167 mole) in toluene (300 ml). After 19 hours the reaction was terminated and 16.1 ml of water were collected. The reaction mixture was filtered and washed with toluene. The resulting polymer product consisted of a cream-colored, granular material.

Analysis calculated for P17: Sn, 48%. Found: Sn, 8.74%.

P24, POLY-TRIBENZYLTIN-ACRYLATE

P24 was synthesized similar to P1 except that tribenzyltin hydroxide (68.19 grams, 0.167 mole) was the organometallic and benzene (300 ml) was the solvent. After running the reaction for 2 hours, 2.5 ml of water were formed. After the solvent evaporated, a clear product polymer remained which was in the form of a film.

Analysis calculated for P24: Sn, 26%. Found: Sn, 23,31%.

P28, POLY-TRIPHENYLTIN-ACRYLATE

P28 was made as P1 was where triphenyltin hydroxide (100.2 grams, 0.273 mole) was reacted with an equimolar quantity of polyacrylic acid (19.65 grams, 0.273 mole) in benzene (400 ml). The reaction ran for 2 hours, at the end of which 4.9 ml of water had been collected azeotropically. P28 was isolated as a cream-colored powder.

Analysis calculated for P28: Sn, 29%. Found: Sn, 31.34%.

P29, POLY-TRI-n-BUTYLTIN-METHACRYLATE

P29 was the reaction product of polymethacrylic acid (28.7 grams, 0.334 mole) and tri-n-butyltin oxide (84.4 ml, 0.167 mole). The reaction was run in benzene (300 ml) for 3 hours, and 4 ml of water were collected azeotropically. P29 was a clear polymer and formed a film when the solvent was evaporated.

Analysis calculated for P29: Sn, 33% Found: Sn, 28.22%.

P31, POLY-TRI-n-PROPYLTIN-METHACRYLATE

P31 was prepared from the reaction of crosslinked polymethacrylic acid (28.8 grams, 0.167 mole) and tri-n-propyltin oxide (33.9 ml, 0.084 mole) in toluene (200 ml). After 3 hours of refluxing, 16.0 ml of water were formed. This high density polymer was a white powder.

Analysis calculated for P31: Sn, 36%. Found: Sn, 31.71%.

P34, POLY-TRI-n-PROPYLTIN-METHACRYLATE

P34 was the product polymer produced by the reaction of polymethacrylic acid (28.7 grams, 0.334 mole) and tri-n-propyltin oxide (67.8 ml, 0.167 mole) in benzene (300 ml). After 4½ hours, 5 ml of water were formed and removed by azeotropic distillation. P34 was a clear product and was cast as a film from a benzene solution.

Analysis calculated for P34: Sn, 36%. Found: Sn, 34.19%.

P36, TRI-n-BUTYLTIN ESTER OF POLY(METHYL VINYL ETHER/MALEIC ACID)

The preparation of P36 was carried out in a 1-liter, 3-necked flask provided with a mechanical stirrer, an azeotropic distillation head connected to a reflux condenser, and a thermometer positioned such that it read the temperature of the reaction solution. The poly(methyl vinyl ether/maleic acid) (29.0 grams, 0.167 mole) was added to the reaction flask, which already contained benzene (300 ml) and tri-n-butyltin oxide (84.4 ml, 0.167 mole). At the end of 3 hours, 6 ml of water were collected azeotropically. P36 was a yellow transparent product which could be cast as a film from the benzene solution.

Analysis calculated for P36: Sn, 32%. Found: Sn, 30.80%.

P37, TRI-n-BUTYLTIN ESTER OF POLY(METHYL VINYL ESTHER/MALEIC ACID)

P37 was prepared as P36 was, except a higher molecular weight poly(methyl vinyl ether/maleic acid) was used. During this reaction, 6.1 ml of water were collected azeotropically. The resultant product was clear and could be cast as a film from the benzene solution.

Analysis calculated for P37: Sn, 32%. Found: Sn, 30.55%.

P38, TRI-n-PROPYLTIN ESTER OF POLY(METHYL VINYL ETHER/MALEIC ACID)

P38 was synthesized similar to P36. The low molecular weight poly(methyl vinyl ether/maleic acid) (29.0 grams, 0.167 mole) was reacted with tri-n-propyltin oxide (67.8 ml, 0.167 mole). From this azeotropic distillation, 6.9 ml of water were collected. P38 was a yellow, transparent polymer which could be cast as a film from the benzene solution.

Analysis calculated for P38: Sn, 36%. Found: Sn, 34.86%.

P39, TRI-n-PROPYLTIN ESTER OF POLY(METHYL VINYL ETHER/MALEIC ACID)

The synthesis of P39 was similar to that of P36, although the higher molecular weight poly(methyl vinyl ether/maleic acid) (29.0 grams, 0.167 mole) and the tri-n-propyltin oxide (67.8 ml, 0.167 mole) were used. From this reaction, 6.1 ml of water were collected azeotropicaly. P39 was isolated as a clear product which could be cast as a film from benzene solution.

Analysis calculated for p39: Sn, 36%. Found: Sn, 32.68%.

Several of the organometallic polymers were polymerized from their prepared monomers, instead of attaching an organometallic moiety to the polymer backbone. The preparation of P30, poly(tri-n-butyltin methacrylate/methyl methacrylate) characterizes the polymerization of organometallic monomers.

P30, POLY(TRI-n-BUTYLTIN METHACRYLATE/METHYL METHACRYLATE)

The monomers of P30 were first synthesized. Tri-n-butyltin methacrylate prepared according to Montermoso et al U.S. Pat. No. 3,016,369. Uninhibited methacrylic acid (37.8 ml, 0.444 mole) and tri-n-butyltin oxide (112.5 ml, 0.222 mole) were reacted in 200 ml of dischloromethane. Upon refluxing for 1 hour, 4.5 ml of water were collected azeotropically. After the reaction was completed, the solvent was evaporated under vacuum. The product ester was a yellow transparent liquid. The monomers were then copolymerized in a 1-liter, 3-necked flask equipped with a reflux condenser, a thermometer, such that it read the temperature of the reactants, and a mechanical stirrer. Tri-n-butyltin methacrylate (50 grams, 0.140 mole), uninhibited methyl methacrylate (50 grams, 0.580 mole), and benzoyl peroxide (0.5% by weight) were reacted in 200 ml of benzene. The solution polymerization was allowed to reflux for 8 hours. The resultant polymer was clear and could be cast as a film from the benzene solution.

Analysis calculated for P30: Sn, 25%. Found: Sn, 16,28%.

P41, POLY-TRI-n-BUTYLTIN-METHACRYLATE

The preparation of P41 was done in order to produce a homopolymer from its monomer. Tri-n-butyltin methacrylate was prepared as described above for P30. The purified monomer was then polymerized in benzene (200 ml) with methyl ethyl ketone peroxide (1% by weight) as the initiator. The polymerization took 3 hours. The resultant product was a colorless, transparent organometallic polymer which could be cast as a film from its benzene solution.

Analysis calculated for P41: Sn, 32%. Found: Sn, 29.05%.

P42, POLY(TRI-n-BUTYLTIN METHACRYLATE/METHYL METHACRYLATE)

P42 was prepared exactly as P30; however in this polymerization the molar ratio of the two monomers was varied. The tri-n-butyltin methacrylate (174.4 grams, 0.444 mole) was used in a 2:1 molar ratio with the uninhibited methyl methacrylate (20.0 grams, 0.222 mole). Benzoyl peroxide (1% by weight) was used as the initiator for the copolymerization. The product polymer was again a colorless, transparent material which could be cast as a film from the benzene solution.

Analysis calculated for P42: Sn, 30%. Found: 25.39%.

P43, POLY(TRI-n-BUTYLTIN METHACRYLATE/METHYL METHACRYLATE)

The polymerization of P43 was similar to that of P30. The same monomers, tri-n-butyltin methacrylate (174.4 grams, 0.444 mole) and uninhibited methyl methacrylate (40.0 grams, 0.444 mole) were copolymerized in equimolar quantities. The initiator for this solution polymerization was benzoyl peroxide (1% weight). P43 was a colorless, transparent copolymer that could be cast as a film from the benzene solution.

Analysis calculated for P43: Sn, 25%. Found: Sn, 21.03%.

P45, POLY(TRI-n-BUTYLTIN-METHACRYLATE/-METHYL METHACRYLATE)

The synthesis of copolymer P45 was performed according to the method for P30. However, the molar ratio of the two monomers was varied such that 2 moles of tri-n-butyltin methacrylate (174.4 grams, 0.444 mole) were used for every 3 moles of uninhibited methyl methacrylate (60.0 grams, 0.666 mole). Benzoyl peroxide (1% weight) was the initiator for the polymerization. The organometallic copolymer was colorless and transparent and could be cast as a film from the benzene solution.

Since the preparation of the organometallic polystyrenes is similar, the preparation of S4, poly(tri-n-butyltin methacrylate/styrene), is given in detail as an example.

S4, POLY(TRI-n-BUTYLTIN METHACRYLATE/STYRENE)

Tri-n-butyltin methacrylate was synthesized according to the mothod of Montermoso, et al, U.S. Pat. No. 3,016,369 (1962). The product, a yellow, transparent liquid, was dissolved in pertroleum ether and recrystalized upon cooling below 20° C. Crystals of tri-n-butyltin methacrylate had a melting point of 18° C. Styrene uninhibited by vacuum distillation and the two monomers were then copolymerized in a 1-liter, 3-necked resin flask equipped with a reflux condenser, a thermometer, such that it read the temperature of the reactants, and a mechanical stirrer. Tri-n-butyltin methacrylate (0.053 mole), uninhibited styrene (0.192 mole), and 2,2'-azobis (2-methylpropionitrile) (0.1% by weight) were reacted in 50 of benzene. An additive, salicylaldehyde (0.2% by weight) was added prior to polymerization to act as an ultraviolet light absorber. The solution polymerization was allowed to reflux for 48 hours. The resultant polymer was a transparent, yellow tinted resin which could be cast as a film from the benzene solution. Tin analysis of S4: 16.64% Sn.

S5, POLY(TRI-n-BUTYLTIN METHACRYLATE/STYRENE)

S5 was synthesized by the general method described above. In this synthesis, equimolar quantities of tri-n-butyltin methacrylate (0.1 mole) and stryene (0.1 mole) were reacted with the azo initiator* in 85 ml of toluene for 96 hours. The resultant polymer was a transparent, orange tinted elastomer which could be cast as a film from the toluene solution. Analysis showed 20.90% Sn.

*Azo initiator stands for 2,2'-azobis(2-methyl propionitrile).

S6, POLY(TRI-n-BUTYLTIN METHACRYLATE/STYRENE)

S6 was prepared as above (1:1 molar ratio) in 300 ml of toluene for 144 hours. The antioxidant, 2,4-dinitrophenylhydrazine (2.0% by weight) was added before polymerization. The resultant polymer was a transparent, yellow tinted elastomer that could be cast as a film from the toluene solution. Analysis showed 23.73% Sn.

S7, POLY(TRI-n-BUTYLTIN METHACRYLATE/STYRENE)

S7 was prepared as above (1:1 molar ratio) in 200 ml of toluene for 264 hours. Both an antioxidant, 4-cyclohexyleyclohexanol (2.0% by weight) and ultraviolet light absorber, Uvinol M-40 (1.0% by weight) were additives in this synthesis. The resultant polymer was a transparent, orange tinted elastomer that could be cast as a film from the toluene solution. Analysis showed 25.43% Sn.

S8, POLY(TRI-n-BUTYLTIN METHACRYLATE/STYRENE)

S8 was prepared with the same additives as in S7. In this synthesis unequal molar quantities of tri-n-butyltin methacrylate (0.1 mole) and stryene (0.2 mole) were reacted with the azo initiator in 200 ml of toluene for 24 hours. The resultant polymer was a transparent, yellow tinted elastomer that could be cast as a film from the toluene solution. Analysis showed 20.46% Sn.

S10, POLY(TRI-n-BUTYLTIN METHACRYLATE)

Tri-n-butyltin methacrylate (0.1 mole) was polymerized using benzoyl peroxide (0.1% by weight) as the initiator in 200 ml of benzene for 24 hours. An antioxidant, Irganox 1076 (0.15% by weight) and an ultraviolet light absorber, Tinuvin P (0.25% by weight) were additives in this synthesis. The resultant polymer was a transparent, colorless elastomer that could be cast from the benzene solution. Analysis showed 31.53% Sn.

S11, POLY(TRI-n-BUTYLTIN METHACRYLATE/STYRENE)

S11 was synthesized as S10 in a 1:1 molar ratio of tri-n-butyltin methacrylate (0.1 mole) and styrene (0.1 mole). The resultant polymer was colorless and clear and could be cast as a film from the benzene solution. Analysis showed 30.01% Sn.

P51, POLY(TRI-n-BUTYLTIN METHACRYLATE/TRI-N-PROPYLTIN METHACRYLATE/METHYL METHACRYLATE)

The monomers of P51 were first synthesized. Tri-n-butyltin methacrylate was prepared as was tripropyltin methacrylate. These esters were isolated as crystals from petroleum ether. Methyl methacrylate was uninhibited. All uninhibited monomers were refrigerated below 40° F when stored for short periods of time. Tri-n-butyltin methacrylate (0.4 mole), tri-n-propyltin methacrylate (0.4 mole) and methyl methacrylate (0.4 mole) were reacted in 300 ml of benzene using benzoyl peroxide (0.5% by weight) as initiator. The reaction mixture was refluxed for 24 hours in a 1-liter, 3-necked resin flask equipped with a reflux condenser, a thermometer, such that it read the temperature of the reactants and a mechanical stirrer. The resultant polymer was clear and could be cast as a film from the benzene solution. Analysis showed 29.35% Sn.

P62, POLY(TRI-n-BUTYLTIN METHACRYLATE/TRI-N-PROPYLTIN METHACRYLATE/METHYL METHACRYLATE)

The preparation of P62 was identical to that of P51.

EXAMPLE 2

Three novel polymeric coating systems were formulated as follows:

| FORMULATION No. 1<br>Component | ORGANOMETALLIC POLYMERIC COATING<br>Parts by Weight |
|---|---|
| Organometallic Polymer | 60 |
| Solvent | 40 |

In this formulation, the organometallic polymers used were all film forming and soluble in organic solvents. These polymers were poly(tributyltin acrylate), poly(tripropyltin acrylate), poly(tributyltin methacrylate), poly(tripropyltin methacrylate), and the tributyltin ester and the tripropyltin ester of poly(methyl vinyl ether/maleic acid). Organometallic copolymers of tributyltin methacrylate and methyl methacrylate in the following molar ratio 1:4, 1:1, 2:1, and 2:3, were also incorporated as organometallic polymers in this formulation. The incorporation of the methyl methacrylate into the polymer of tributylin methacrylate allowed various degrees of hardness to be obtained in the film. The more methyl methacrylate units in the copolymers, the more rigid the polymer became approaching the hardness of poly(methyl methacrylate). Organometallic monomers were also polymerized with styrene in place of methyl methacrylate. Furthermore, a terpolymer of tributyltin methacrylate, tripropyltin methacrylate and methyl methacrylate was prepared in a 1:1:1 molar ratio which was also used as the organometallic polymer in formulation No. 1. In addition, copolymers were prepared of two or more of the organometallic monomers and methyl methacrylate to produce an organometallic polymer suitable for use in antifouling formulation No. 1. Mixes of different organotin polymers were also used as the organometallic substituent in the formulation. Table I lists the mixtures used and their composition.

TABLE I

| Mixture # | Composition of organometallic polymers in mixture in a 1:1 ratio by weight |
|---|---|
| M1 | Poly(tributyltin methacrylate)/Poly(tripropyltin methacrylate) |
| M3 | Poly(tributyltin acrylate)/Poly(tripropyltin acrylate) |
| M4 | Tributyltin ester of poly(methyl vinyl ether/maleic acid)/tripropyltin ester of poly(methyl vinyl ether/maleic acid) |

The combination of two organotin polymers with each possessing a different organotin group in the coating formulation increases the kill spectrum of the biocide material, since micro- and macro- faulants are known to be susceptible in varying degrees to different biocides. As the solvent in formulation No. 1, benzene, toulene or dichloromethane are used depending on the solubility of the organometallic polymer(s) in the polymeric coating.

The organometallic polymers which were powders were incorporated into either an acrylic or vinyl resin system. The composition of these resins system are listed as follows:

| FORMULATION No. 2 Components | ORGANOMETALLIC VINYL RESIN SYSTEM Parts by Weight |
|---|---|
| Organometalic polymer | 33.0 |
| Methyl isobutyl ketone | 25.3 |
| Xylene | 22.7 |
| Polyvinyl acetate resin (Union Carbide VAGH Resin) | 11.4 |
| Organic Acid Rosin (Westvaccos WW Resin) | 7.6 |

| FORMULATION No. 3 Components | ORGANOMETALLIC ACRYLIC RESIN SYSTEM Parts by Weight |
|---|---|
| Organometallic polymer | 33.0 |
| Acrylic polyester* | 66.0 |
| Methyl ethyl ketone peroxide | 1.0 |

*Castolite AP. available from Rohm and Haas, Co.

The organometallic polymers incorporated into either Formulation No. 2 or No. 3 resin system were the tributyltin ester of carboxymethyl cellulose, a high density poly(tributyltin methacrylate) and poly(triphenyltin acrylate).

EXAMPLE 3

The antifouling performance of the low leaching organometallic formulation was proven at the United States Naval Shipyard at Pearl Harbor Hawaii which is a heavy fouling area. The panels were judged by the percentage of surface covered by fouling. The fouling rating is determined as 100 minus the percent covered by fouling. The polymeric materials showed 90-100% antifouling performance after many months of exposure to severe tropical fouling conditions as indicated in Table 2.

The low leaching organometallic polymer compositions of this invention permit control of marine fouling organisms in cluding bacteria, algae, tubeworms, hydroids, bryoyoans, marine borers, barnacles, Limnoria and tunicates. Many of the compositions are transparent and devoid of color. They are not deactivated by contact with steel or aluminum and do not contribute to galvanic corrosion.

TABLE 2

| Organometallic Polymer or Mixture No. | Formulation No. Organometallic Polymer Incorporated In: | % Antifouling Performance | Months Exposed |
|---|---|---|---|
| Poly(tributyltin acrylate) | No. 1 | 100 | 16 |
| Poly(tripropyltin acrylate) | No. 1 | 100 | 6 |
| Poly(tributyltin acrylate/tripropyltin acrylate) | No. 1 | 100 | 6 |
| Poly(tributyltin methacrylate)* | No. 2 & No. 3 | 90 | 19 |
| Poly(tributyltin acrylate)* | No. 1 | 100 | 16 |
| Poly(tripropyltin acrylate)* | No. 1 | 90 | 17 |
| Poly(triphenyltin acrylate) | No. 2 & No. 3 | 100 | 10 |
| Poly(tributyltin methacrylate) | No. 1 | 100 | 17 |
| Poly(tripropyltin methacrylate) | No. 1 | 100 | 8 |
| Tributyltin ester of carboxymethyl cellulose | No. 2 | 90 | 5 |
| Tributyltin ester of poly (methyl vinyl ether/maleic acid) | No. 1 | 100 | 17 |
| Tributyltin ester of poly (metyl vinyl ether/maleic acid)* | No. 1 | 100 | 17 |
| Tripropyltin ester of poly (methyl vinyl ether/maleic acid) | No. 1 | 100 | 16 |
| Tripropyltin ester of poly (methyl vinyl ether/maleic acid)* | No. 1 | 100 | 12 |
| Poly(tributyltin methacrylate/methyl methacrylate) (1:4 molar ratio) | No. 1 | 100 | 16 |
| Poly(tributyltin methacrylate | | | |

TABLE 2-continued

| Organometallic Polymer or Mixture No. | Formulation No. Organometallic Polymer Incorporated In: | % Antifouling Performance | Months Exposed |
|---|---|---|---|
| methyl methacrylate) (2:1 molar ratio) | No. 1 | 100 | 17 |
| Poly(tributyltin methacrylate/ methyl methacrylate) (1:1 molar ratio) | No. 1 | 100 | 17 |
| Poly(tributyltin methacrylate/ methyl methacrylate) (2:3 ratio) | No. 1 | 100 | 17 |
| M1 | No. 1 | 100 | 16 |
| M3 | No. 1 | 100 | 16 |
| M4 | No. 1 | 100 | 16 |
| Poly(tributyltin methacrylate/ tripropyltin methacrylate/ methyl methacrylate) | No. 1 | 100 | 5 |
| Poly(tributyltin methacrylate/ styrene) | No. 1 | 100 | 9 |

*High Density Polymer

Differences in molecular weight of organometallic polymers did not affect the antifouling performance of those polymers tested. Exposure data indicated that the optimum antifouling performance may be expected from the organometallic polymers which are suitable for incorporation into formulation No. 1 and which possess a variety of organometallic groups attached to the polymer backbone.

EXAMPLE 4

The relationship between the sea water solubility biotoxicity of organometallic polymers and a standard paint system was determined. Relative sea water solubility of candidate organometallic polymers and a conventional tri-n-butyltin fluoride based antifouling paint was studied using a Burrell Wrist-Action Shaker. Each organometallic polymer was dried at 0.5 mm Hg and 180° C for 1 week. Approximately 5 gram samples of each polymer were placed in 50 ml of artificial sea water (Rila Marine Mix) which were then agitated continuously. The tri-n-butyltin fluoride based antifouling paint was coated on a fluorinated panel surface to facilitate removal. After air drying, 5 grams of this paint film were also placed in 50 ml of artificial sea water and agitated continuously. The sea water was decanted and replaced with a fresh 50 ml quantity every 3 days. The decanted water was analyzed for tin content using a Perkin Elmer Model 303 Atomic Absorbtion Spectrophotometer.

These results showed that methacrylic organometallic polymers have good antifouling capability, while releasing organometallic ions at least one order of magnitude less than a state-of-the-art tri-n-butyltin fluoride based antifouling paint. During five weeks of agitation in artificial sea water P42, poly(tri-n-butyltin methacrylate/methyl methacrylate), had released 45% less organotin ions than P41, poly(tri-n-butyltin methacrylate). P41 has a 33% greater molar substitution of tri-n-butyltin moieties than P42. This data indicates that the degree of leaching from an organometallic polymer may be controlled.

Obviously, many modifications and variations of the present invention are possible in light of the above teachings. It is therefore to be understood that, within the scope of the appended claims, the invention may be practiced otherwise than as specifically described.

What is claimed as new and desired to be secured by Letters Patent of the United States is:

1. A composition of matter for preventing the growth of fouling organisms on marine structures said composition being characterized by a low leaching rate of the antifouling agent from the composition and comprising an organotin containing polymer, said polymer being the reaction product of a copolymer of methyl vinyl ether and maleic acid and an organotin oxide of the formula:

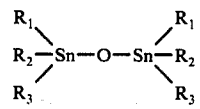

wherein $R_1$, $R_2$ and $R_3$ may be the same or different and are selected from the group consisting of propyl, butyl, phenyl and benzyl.

2. The composition of claim 1 which additionally contains an organic solvent in which said organotin containing polymer is soluble.

3. The composition of claim 2 wherein said organic solvent is selected from the group consisting of benzene, toluene and dichloromethane.

4. The composition of claim 2 wherein the organotin compound is bis(tri-n-butyl) tin oxide and the solvent is benzene.

5. The composition of claim 2 wherein the organotin compound is bis(tri-n-propyl) tin oxide and the solvent is benzene.

6. A method for preventing the growth of fouling organisms on a marine structure which comprises applying to the surface of said structure a coating of an organotin containing polymer said polymer being the reaction product of a copolymer of methyl vinyl ether and maleic acid and an organotin oxide of the formula:

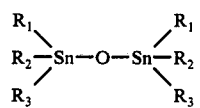

wherein $R_1$, $R_2$ and $R_3$ may be the same or different and are selected from the group consisting of propyl, butyl, phenyl and benzyl.

7. The method of claim 6 wherein the organotin compound is bis(tri-n-butyl) tin oxide.

8. The method of claim 6 wherein the organotin compound is bis (tri-n-propyl) tin oxide.

9. A composition of matter for preventing the growth of fouling organisms on marine structures said composition being characterized by a low leaching rate of the antifouling agent from the composition and comprising an organotin containing polymer, said polymer being the reaction product of a copolymer of methyl vinyl ether and maleic acid and an organotin hydroxide of the formula:

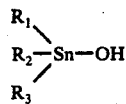

wherein $R_1$, $R_2$ and $R_3$ may be the same or different and are selected from the group consisting of propyl, butyl, phenyl and benzyl.

10. The composition of claim 9 which additionally contains an organic solvent in which said organotin containing polymer is soluble.

11. The composition of claim 10 wherein said organic solvent is selected from the group consisting of benzene, toluene and dichloromethane.

12. A method for preventing the growth of fouling organisms on a marine structure which comprises applying to the surface of said structure a coating of an organotin containing polymer said polymer being the reaction product of a copolymer of methyl vinyl ether and maleic acid and an organotin hydroxide of the formula:

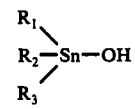

wherein $R_1$, $R_2$ and $R_3$ may be the same or different and are selected from the group consisting or propyl, butyl, phenyl and benzyl.

* * * * *